United States Patent [19]

Sazaki

[11] 4,162,048
[45] Jul. 24, 1979

[54] SPINNING REEL WITH ADJUSTABLE BAIL ARM RETURN SPRING

[75] Inventor: Kounin Sazaki, Fukuyama, Japan

[73] Assignee: Ryobi Ltd., Fuchu, Japan

[21] Appl. No.: 878,352

[22] Filed: Feb. 16, 1978

[30] Foreign Application Priority Data

Feb. 16, 1977 [JP] Japan .............................. 52-18269[U]

[51] Int. Cl.² ............................................. A01K 89/00
[52] U.S. Cl. ........................ 242/84.2 G; 242/84.21 R
[58] Field of Search ................. 242/84.2 G, 84.2 R, 242/84.2 A, 84.2 B, 84.2 C, 84.2 D, 84.2 E, 84.2 F, 84.2 H, 84.21 R, 84.21 A

[56] References Cited

U.S. PATENT DOCUMENTS

| 2,498,987 | 2/1950 | Duncan | 242/84.21 R |
|---|---|---|---|
| 2,568,986 | 9/1951 | Brown | 242/84.21 R |
| 2,690,309 | 9/1954 | Cuonz et al. | 242/84.21 R |
| 2,713,463 | 7/1955 | Sarah | 242/84.21 R |
| 2,777,645 | 1/1957 | Wood | 242/84.21 R |
| 2,832,550 | 4/1958 | Mauborgne | 242/84.21 R |
| 3,796,391 | 3/1974 | McMickle | 242/84.21 A |

FOREIGN PATENT DOCUMENTS

| 944828 | 6/1956 | Fed. Rep. of Germany | 242/84.21 R |
|---|---|---|---|
| 919747 | 12/1946 | France | 242/84.21 R |
| 1217679 | 12/1959 | France | 242/84.21 R |

*Primary Examiner*—Stanley N. Gilreath
*Attorney, Agent, or Firm*—Sughrue, Rothwell, Mion, Zinn and Macpeak

[57] ABSTRACT

A return force controlling mechanism for a bail arm of a spinning reel is disclosed, wherein one end of the bail arm return spring is fitted in a bail arm lever rotatably secured to one of bail arm supports and the other end of a bail arm is contacted to an arcuate surface of a cam member rotatably provided in the support. The other end of the spring is displaced by stepping rotation of the cam member, whose arcuate surface is formed to have an increasing radius whereby the biasing force applied by the bail arm spring is quickly and easily changed.

5 Claims, 5 Drawing Figures

SPINNING REEL WITH ADJUSTABLE BAIL ARM RETURN SPRING

BACKGROUND OF THE INVENTION

This invention relates to a return force controlling mechanism for the bail arm of a spin fishing reel.

In the prior art spinning reels, the bail arm is pivotally mounted on rotor posts and biased toward a retrieve or rewind position by a torsion spring. The biasing force or spring force acting on the bail arm is constant and unchangeable, since one end of the spring is connected to a bail arm lever provided on one of the posts and the other end thereof is connected to a bail support. The bail arm is sometimes returned with undue shock and impact, as during very warm weather when the lubricants are less viscous, or is not fully returned when released, as when the lubricants are hardened in cold weather or the frictional forces are increased owing to dirty or worn parts. Therefore, earnest requests have been made by the fisherman to manually control the return force of the bail arm dependent upon the fisherman's preference, condition of reel, weather conditions, etc.

SUMMARY OF THE INVENTION

It is therefor an object of the present invention to overcome the above-mentioned drawbacks and disadvantages and to provide an improved spinning reel. Accordingly, the present invention is directed to a spinning reel wherein the bail arm return spring is easily adjustable to thereby permit the biasing force applied to the bail arm to be controlled in accordance with various conditions and fisherman's individual preference.

Briefly, and in accordance with the present invention, such adjustability is implemented by fitting one end of an upwardly bend portion of the return spring with a bail arm lever and contacting the other end thereof to the arcuate cam surface of the cam member rotatably secured to a bail support by a shaft member. The cam surface is formed to have an increasing radius with respect to the shaft to slidingly displace the other end of the spring, whereby the spring force of the spring to turn the bail arm is controlled.

DETAILED DESCRIPTION OF THE INVENTION

Figure 1:
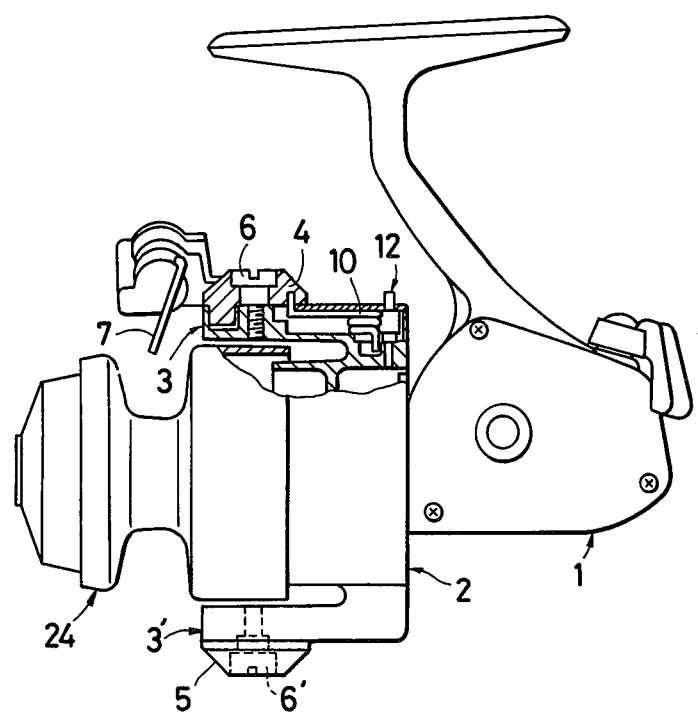
FIG. 1 shows a plan view of a spinning reel according to the present invention in partial cutaway.

Referring now to the drawings, and initially to FIG. 1, a pair of bail supports 3 and 3' project outwardly from the diametrically opposite sides of a rotor 2 journalled in a reel body 1. The opposite ends of a bail arm 7 are secured to a bail arm lever 4 and a bail arm pivot cam 5, respectively, both journalled for rotation on the bail supports 3 and 3' by shouldered retaining screws 6 and 6'. Reference numeral 24 designates a spool. The bail arm pivot cam 5 selectively permits changing the bail arm to its fishing line retrieve and take-up positions by manual and/or automatic operation.

The construction described thus far is all conventional and within the prior art. The modification according to the present invention provides a means for quickly and easily adjusting the tension of the bail arm return spring and thus the biasing force applied to a bail arm 7 as described below.

Figure 2:
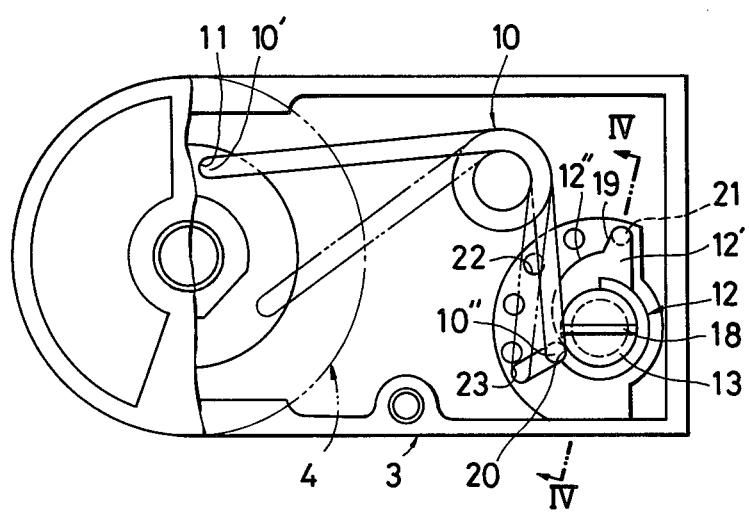
FIG. 2 shows an enlarged side view of the cutaway portion shown in FIG. 1.
Figure 3:
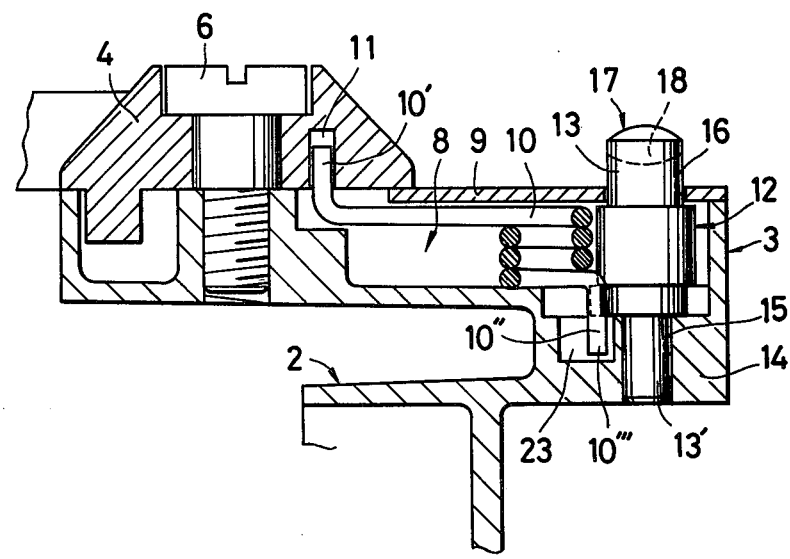
FIG. 3 shows an enlarged cross-sectional view of the cutaway portion shown in FIG. 1.

According to the present invention, in FIGS. 1 through 3, a recessed portion 8 is formed in one of the bail supports 3 which journals bail arm lever 4. The recess 8 is enclosed by a cover plate 9 fixed thereto by a screw (not shown). In the interior of the recess 8, a bail arm turning spring 10 is provided to bias the bail arm toward retrieve and rewind positions, i.e., the position of spring end 10' exerts no force on the bail arm. The dead point of the spring 10 is set between the spring positions at which the bail arm is in retrieve and rewind positions. One end 10' of the spring 10 is fitted in a hole 11 formed in the bail arm lever 4.

Figure 4:
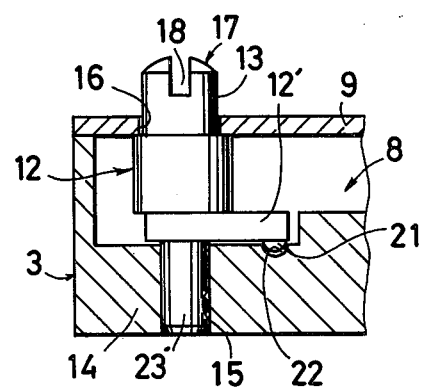
FIG. 4 shows a cross sectional view taken along the line IV—IV of FIG. 2.

In the recessed portion 8 of the bail support 3, a cam member 12 is provided spaced apart from the bail arm lever 4. The cam member is vertically and fixedly secured to a shaft 13 and 13' rotatably and vertically supported in a hole 16 formed in the cover plate 9 and an elongated hole 15 formed in a bottom wall 14 of the bail support. At an open end 17 of the shaft 13, a straight groove 18 is formed to receive a screwdriver or a coin for rotating the shaft and the cam 12 without removing the cover plate 9. A cam 12' of the cam 12 is formed to have an arcuate cam surface 12" having an increasing radius with respect to the center of the shaft 13. Stopper faces 19 and 20 are provided in the cam surface 12" at the maximum and minimum radius portions, respectively. As shown most clearly in FIGS. 2 and 4, the bottom surface of the cam plate 12' a roundish projection 21 is provided to steppingly engage a plurality of holes formed in the bottom wall 14 at an equal interval along imaginary circle, the radius of which is the distance between the center of the shaft 13 and the roundish projection 21. Therefore, the cam 12 is steppingly rotated by the selective engagement between the projection 21 and one of the plurality of holes 22.

The other end 10" of the ball return spring 10 contacts the arcuate cam surface 12" due to the tension thereof, and the displacement of the end portion 10" due to the rotation of the cam 12 varies the biasing force of the spring 10. The end portion 10" of the spring 10 provided with a downwardly bent portion 10''' adapted to be inserted in a slot 23 formed in the bottom wall 14 in order to slidingly guide the displacement of the end portion 10".

In operation, when the bail arm 7 is in fishing line take-up position as shown in FIG. 1, the end 10' of the spring 10 is at a position shown by a solid line in FIG. 2, and when the bail arm 7 is in fishing line retrieve position, the end 10' thereof is at a position shown by a broken line in FIG. 2. In both cases, the bail arm is held at the predetermined positions by the biasing force of the spring 10, the dead point of which is set between the solid and broken lines in FIG. 2, so that if the bail arm 7 is manually or automatically moved to turn the same, the bail arm is moved without external force but by its own spring force upon the spring 10 being exceeded the dead point.

When the other end 10″ of the spring 10 is at a position shown by a solid line in FIG. 2, since the distance between the ends 10′ and 10″ is the largest, the spring force acting on the bail arm is the weakest. However, if the cam 12 is rotated counterclockwise by rotating the shaft 13, the other end 10″ of the spring 10 is moved to the position shown by a chain line by the arcuate cam surface 12″. The other end 10″ of the spring 10 is displaced to the spring winding direction in thereby increase the biasing force, whereby the force to turn the bail arm lever is increased.

Figure 5:
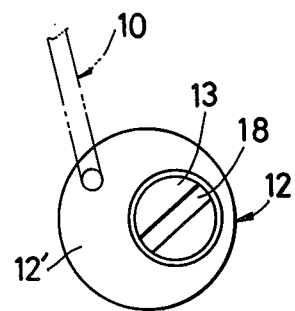
FIG. 5 is an alternative embodiment showing a cam member.

FIG. 5 shows an anternative embodiment of the cam member, wherein shaft 13 and 13′ is eccentrically provided on the cam plate 12 into which the other end 10″ of the spring 10 is inserted. With this structure, the similar function and effect is achieved as is done in the first-mentioned cam member.

While the invention has been described in detail and with reference to specific embodiments thereof, it will be apparent to one skilled in the art that various changes and modifications can be made therein without departing from the spirit and scope thereof.

What is claimed is:

1. In a spinning reel including a reel body, a rotor journalled to the reel body, a pair of bail supports projecting outwardly from the diametrically opposite sides of the rotor, a bail arm secured at one end to a bail arm lever and at the other end to a bail arm pivot cam, both rotatably journalled on the bail supports, spring tension adjustment means characterized by:
    (a) a bail arm return spring positioned in one of the bail supports which secures the bail arm lever, one end of the spring being fitted into the bail arm lever, and
    (b) a cam member rotatably supported in the bail support, the other end of the bail arm return spring being contacted to the cam member to change the biasing force thereof.

2. A spinning reel as defined in claim 1, wherein the cam member comprises;
    (a) a cam plate having an arcuate cam surface, and
    (b) a central shaft extending through said one bail support and fixedly secured to the cam plate to rotate the same, said cam surface being formed to have an increasing radius with respect to the shaft to contact said spring and change the biasing force thereof.

3. A spinning reel as defined in claim 2, wherein each of said cam plate and said one bail support has a bottom wall, wherein the bottom wall of said cam plate is provided with a roundish projection and wherein the bottom wall of said one bail support is provided with a plurality of holes, said holes being formed at an interval along an imaginary circle, the radius of which is the distance between the shaft and the roundish projection formed in the bottom wall of the cam plate, said holes being selectively engaged with the roundish projection so that the cam plate may be steppingly rotated.

4. A spinning reel as defined in claim 1, wherein said one bail support has a bottom wall, wherein said bottom wall of said one bail support is provided with a slot and wherein the other end of the bail return spring is downwardly bent to slidingly engage said slot for guiding the displacement of said other end of the spring.

5. A spinning reel as defined in claim 1, wherein the end of said bail arm secured to said spring is movable between take-up and retrieve positions and wherein said spring has a dead point when said bail arm is at a position between said take-up and retrieve positions.

* * * * *